US012286137B2

(12) United States Patent
Fujiki et al.

(10) Patent No.: US 12,286,137 B2
(45) Date of Patent: Apr. 29, 2025

(54) VEHICLE CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventors: Takuya Fujiki, Edogawa-ku-Tokyo-to (JP); Ryusuke Kuroda, Edogawa-ku-Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 18/194,980

(22) Filed: Apr. 3, 2023

(65) Prior Publication Data

US 2023/0365164 A1 Nov. 16, 2023

(30) Foreign Application Priority Data

May 11, 2022 (JP) ................................. 2022-078330

(51) Int. Cl.
*B60W 60/00* (2020.01)
*B60H 1/00* (2006.01)
*B60W 50/14* (2020.01)

(52) U.S. Cl.
CPC ..... *B60W 60/0053* (2020.02); *B60H 1/00785* (2013.01); *B60W 50/14* (2013.01); *B60W 2555/20* (2020.02)

(58) Field of Classification Search
None
See application file for complete search history.

(56) References Cited

U.S. PATENT DOCUMENTS

2010/0209892 A1* 8/2010 Lin ...................... G09B 19/167
434/71
2016/0282865 A1* 9/2016 Shimizu ................ B60S 1/0848
(Continued)

FOREIGN PATENT DOCUMENTS

DE 10 2019 134 840 A1 6/2021
JP 2002-120545 A 4/2002
(Continued)

OTHER PUBLICATIONS

Black Tesla, Tesla v8.0 Autopilot—Warning Interval & Autosteer Unavailable, Youtube, Sep. 24 2016, (https://www.youtube.com/watch?v=isZ3fSbE_pg&t=322s) (Year: 2016).*
(Continued)

*Primary Examiner* — James J Lee
*Assistant Examiner* — Andrew Sang Kim
(74) *Attorney, Agent, or Firm* — Sughrue Mion, PLLC

(57) ABSTRACT

A vehicle controller includes a processor configured to determine whether there is fogging on a window of a vehicle or a sign of fogging thereof, based on a fogginess sensor signal indicating a physical index related to the degree of fogging of the window of the vehicle or operation of a vehicle-mounted device of the vehicle capable of defogging operation. The fogginess sensor signal is obtained by a fogginess sensor provided on the vehicle. The processor is further configured to change a driving control level applicable to the vehicle so as to increase or prevent decreasing the degree of a driver's involvement in driving the vehicle, depending on the driving control level currently applied to the vehicle, upon determination that there is fogging on the window of the vehicle or a sign of fogging thereof.

8 Claims, 5 Drawing Sheets

(56) References Cited

U.S. PATENT DOCUMENTS

2018/0043904 A1* 2/2018 Cullinane ............ G05D 1/0223
2018/0046183 A1* 2/2018 Peters ............... B60W 50/0225

FOREIGN PATENT DOCUMENTS

| JP | 2006-341753 A | 12/2006 |
| --- | --- | --- |
| JP | 2009-241648 A | 10/2009 |
| JP | 2017-170953 A | 9/2017 |

OTHER PUBLICATIONS

Espacenet English Translation of DE102019134840A1 (Year: 2019).*

* cited by examiner

VEHICLE CONTROLLER, METHOD, AND COMPUTER PROGRAM FOR VEHICLE CONTROL

FIELD

The present invention relates to a vehicle controller, a method, and a computer program for vehicle control.

BACKGROUND

To carry out autonomous driving control of a vehicle or assist a driver in driving a vehicle, it is desirable that the surroundings of the vehicle be able to be monitored by a vehicle-mounted sensor. However, it may be difficult to monitor the vehicle surroundings, depending on the environment around the vehicle. Thus, a technique to switch on or off driving assistance control according to the situation of backlight has been proposed (see Japanese Unexamined Patent Publication JP2009-241648A). In addition, a technique to assist a driver to carry out an effective air conditioning operation for defogging before vehicle windows fog has been proposed (see Japanese Unexamined Patent Publication JP2006-341753A).

A driving assistance device disclosed in JP2009-241648A sets conditions for starting or cancelation of a pause in driving assistance control of a host vehicle, based on the yaw rate or yaw angle of the host vehicle, when backlight is detected. The driving assistance device executes driving assistance control of the host vehicle, based on information on a specific object detected from a captured image, and starts or cancels a pause in driving assistance control in accordance with the set conditions.

A vehicular information display disclosed in JP2006-341753A determines whether to a window defogging operation should be performed, based on the state of the vehicle and its air conditioner. When it is determined that a window is fogged, the vehicular information display highlights air-conditioning operation to defog the window, on a display unit.

SUMMARY

Even when a driver is urged to carry out to operate a device for defogging a vehicle window, the driver may not carry out the operation for some reason. In such a case, a window may become fogged, thereby making it difficult to monitor the vehicle surroundings, and to continue autonomous driving control or driving assistance, impairing vehicle control. In addition, by transferring driving control to the driver or stopping application of driving assistance after it becomes difficult to monitor the surroundings of the vehicle, the driver may have difficulty driving the vehicle under adverse conditions.

It is an object of the present invention to provide a vehicle controller that can prevent vehicle control from being undermined by fogging of vehicle windows.

According to an embodiment, a vehicle controller is provided. The vehicle controller includes a processor configured to: determine whether there is fogging on a window of a vehicle or a sign of fogging thereof, based on a fogginess sensor signal indicating a physical index related to the degree of fogging of the window of the vehicle or operation of a vehicle-mounted device of the vehicle capable of carrying out defogging, the fogginess sensor signal being obtained by a fogginess sensor provided on the vehicle, and change a driving control level applicable to the vehicle so as to increase or prevent decreasing the degree of a driver's involvement in driving the vehicle, depending on the driving control level currently applied to the vehicle, upon determination that there is fogging on a window of the vehicle or a sign of fogging thereof.

When the driving control level currently applied to the vehicle is such that the driver's driving operation is required, the processor of the vehicle controller preferably prevents decreasing the degree of the driver's involvement in driving by prohibiting application of a driving control level at which the driver's driving operation is not required.

When the driving control level currently applied to the vehicle is such that driving control is executed without the driver's involvement in driving, the processor of the vehicle controller preferably increases the degree of the driver's involvement in driving by changing the driving control level to a level at which the driver is required to watch around the vehicle.

In this case, the processor is preferably further configured to notify the driver that it is difficult to continue autonomous driving control of the vehicle, via a notification device provided on the vehicle, upon determination that there is a possibility of fogging of the window. After a predetermined waiting period from the notification, the processor preferably changes the applicable driving control level to a level at which the driver is required to watch around the vehicle.

Alternatively, the processor is preferably further configured to notify the driver that the vehicle-mounted device is to be operated to execute defogging operation, via a notification device provided on the vehicle, upon determination that there is a possibility of fogging of the window of the vehicle. The processor preferably changes the driving control level applicable to the vehicle so as to increase the degree of the driver's involvement in driving the vehicle, in the case where the vehicle-mounted device does not execute defogging operation even after a predetermined waiting period from the notification, and where the sign of fogging of the window of the vehicle has not disappeared.

The vehicle-mounted device is preferably an air conditioner, and the processor preferably determines that there is a sign of fogging of the window of the vehicle, in the case where the air conditioner is not executing defogging operation at present and executed defogging operation in a preceding predetermined period.

According to another embodiment, a method for vehicle control is provided. The method includes determining whether there is fogging on a window of a vehicle or a sign of fogging thereof, based on a fogginess sensor signal indicating a physical index related to the degree of fogging of the window of the vehicle or operation of a vehicle-mounted device of the vehicle capable of defogging operation, the fogginess sensor signal being obtained by a fogginess sensor provided on the vehicle; and changing a driving control level applicable to the vehicle so as to increase or prevent decreasing the degree of a driver's involvement in driving the vehicle, depending on the driving control level currently applied to the vehicle, upon determination that there is fogging on the window of the vehicle or a sign of fogging thereof.

According to still another embodiment, a non-transitory recording medium that stores a computer program for vehicle control is provided. The computer program includes instructions causing a processor mounted on a vehicle to execute a process including determining whether there is fogging on a window of the vehicle or a sign of fogging thereof, based on a fogginess sensor signal indicating a physical index related to the degree of fogging of the window of the vehicle or operation of a vehicle-mounted device of the vehicle capable of defogging operation, the fogginess sensor signal being obtained by a fogginess sensor provided on the vehicle; and changing a driving control level applicable to the vehicle so as to increase or prevent decreasing the degree of a driver's involvement in driving the vehicle, depending on the driving control level currently applied to the vehicle, upon determination that there is fogging on the window of the vehicle or a sign of fogging thereof.

The vehicle controller according to the present disclosure has an advantageous effect of being able to prevent vehicle control from being destabilized by fogging of a vehicle window.

DESCRIPTION OF EMBODIMENTS

A vehicle controller, a method for vehicle control executed by the vehicle controller, and a computer program for vehicle control will now be described with reference to the attached drawings. The vehicle controller determines the presence or absence of fogging on a window of a vehicle (e.g., the front or rear window of the vehicle interior, which will be referred to simply as a "window" below) or a sign of fogging. Upon determination that there is fogging on the window or a sign of fogging, the vehicle controller degrades autonomous driving control of the vehicle, depending on a driving control level currently applied to the vehicle. More specifically, upon detection of fogging on the window or a sign of fogging, the vehicle controller increases or prevents decreasing the degree of a driver's involvement in vehicle control, depending on the driving control level currently applied to the vehicle. In this way, the vehicle controller prevents vehicle control from being destabilized by fogging of a window.

Figure 1:
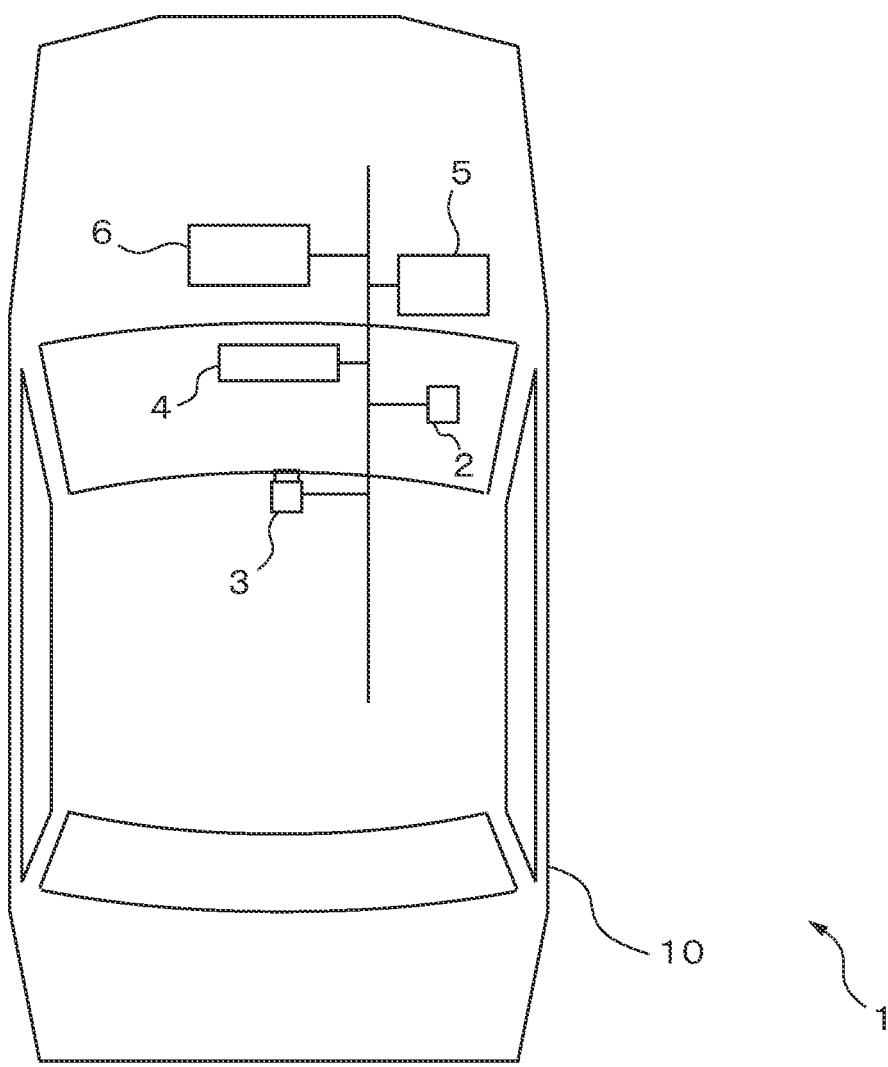
FIG. 1 schematically illustrates the configuration of a vehicle control system including a vehicle controller.

FIG. 1 schematically illustrates the configuration of a vehicle control system including the vehicle controller. The vehicle control system 1 mounted on a vehicle 10 includes a fogginess sensor 2, a vehicle exterior sensor 3, a notification device 4, and an electronic control unit (ECU) 5, which is an example of the vehicle controller. The fogginess sensor 2, the vehicle exterior sensor 3, and the notification device 4 are communicably connected to the ECU 5 via an in-vehicle network conforming to a communication standard, such as a controller area network. The ECU 5 is further connected via the in-vehicle network to an air conditioner 6 for adjusting the temperature and humidity in the interior of the vehicle 10. The air conditioner 6 is an example of a vehicle-mounted device capable of operation for defogging. The vehicle control system 1 may further include a navigation device (not illustrated), a wireless communication device (not illustrated), and a receiver (not illustrated) that receives signals from a satellite positioning system to determine the position of the vehicle 10, such as a GPS receiver.

The fogginess sensor 2 measures a physical index related to the degree of fogging of a window at predetermined intervals, and generates a fogginess sensor signal indicating the measured value. In the present embodiment, the fogginess sensor 2 is a humidity sensor, placed in the interior of the vehicle 10, and measures the humidity of the interior of the vehicle 10 as the physical index related to the degree of fogging. The fogginess sensor 2 then generates a signal indicating the measured value of humidity of the vehicle interior as the fogginess sensor signal.

Every time a fogginess sensor signal is generated, the fogginess sensor 2 outputs the generated fogginess sensor signal to the ECU 5 via the in-vehicle network.

The vehicle exterior sensor 3 generates an exterior sensor signal representing the surroundings of the vehicle 10 at predetermined intervals. For example, the vehicle exterior sensor 3 may be a camera provided in the interior of the vehicle 10 so as to take pictures of a predetermined region outside the vehicle 10 (e.g., a region in front of the vehicle 10). In this case, the exterior sensor signal is an image representing the predetermined region. Alternatively, the vehicle exterior sensor 3 may be a range sensor, such as LiDAR or radar, which measures the distances to objects around the vehicle 10. In this case, the exterior sensor signal is a ranging signal indicating the distance to an object within a predetermined measurement range for each bearing. The vehicle 10 may be provided with multiple vehicle exterior sensors 3 that take pictures in different orientations or that have different measurement ranges.

Every time an exterior sensor signal is generated, the vehicle exterior sensor 3 outputs the generated exterior sensor signal to the ECU 5 via the in-vehicle network.

The notification device 4 is provided in the interior of the vehicle 10, and makes predetermined notification to the driver with light, voice, or displayed text or images. To achieve this, the notification device 4 includes, for example, at least one of a speaker, a light source, or a display. Upon receiving notification to the driver from the ECU 5, the notification device 4 informs the driver of the notification by outputting a voice from the speaker, lighting or blinking the light source, or displaying the notification on the display.

The ECU 5 executes autonomous driving control of the vehicle 10 when a control switch (not illustrated) provided in the interior of the vehicle 10 is operated to execute autonomous driving control of the vehicle 10. The ECU 5 determines the presence or absence of fogging on a window or a sign of fogging, based on a fogginess sensor signal or a signal indicating operation of the air conditioner, and adjusts the degree of the driver's involvement in control of the vehicle 10, depending on the result of determination and the state of autonomous driving control.

Figure 2:
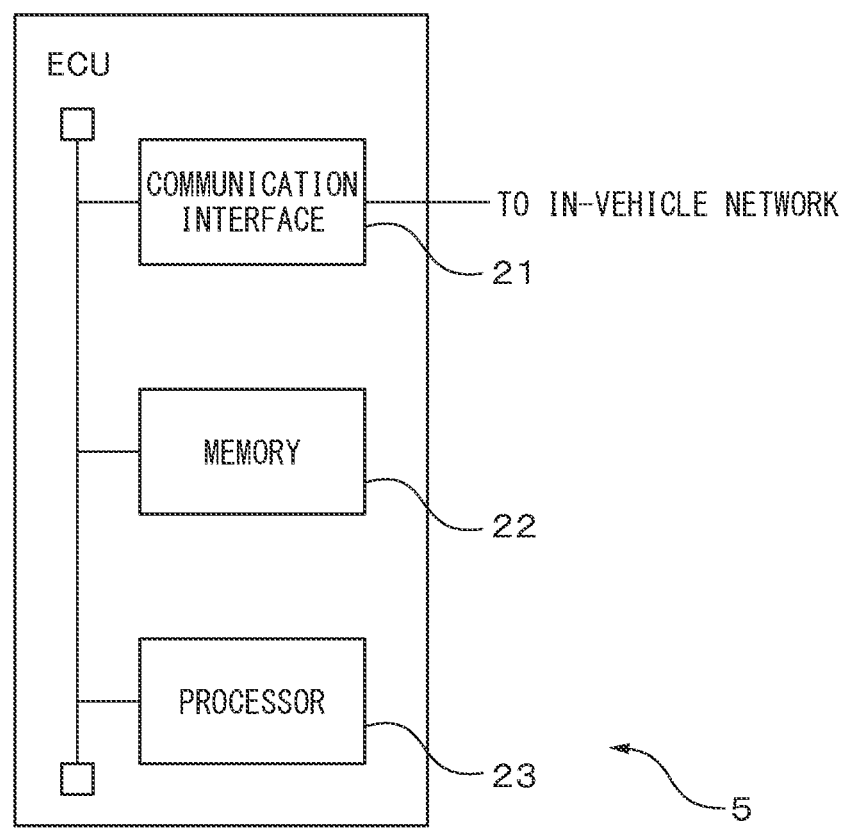
FIG. 2 illustrates the hardware configuration of an ECU, which is an example of the vehicle controller.

FIG. 2 illustrates the hardware configuration of the ECU 5. As illustrated in FIG. 2, the ECU 5 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 5 to the in-vehicle network. Every time a fogginess sensor signal is received from the fogginess sensor 2, the communication interface 21 passes the fogginess sensor signal to the processor 23. Every time an exterior sensor signal is received from the vehicle exterior sensor 3, the communication interface 21 passes the exterior sensor signal to the processor 23. Every time an operation signal indicating the state of operation is received from the air conditioner 6, the communication interface 21 passes the operation signal to the processor 23. Further, upon receiving notification to the driver from the processor 23, the communication interface 21 outputs the notification to the notification device 4.

The memory 22, which is an example of a storage unit, includes, for example, volatile and nonvolatile semiconductor memories. The memory 22 stores various algorithms and various types of data used in a vehicle control process executed by the processor 23 of the ECU 5. For example, the memory 22 stores various parameters used for determining, for example, the presence or absence of fogging and messages to be notified to the driver. In addition, the memory 22 temporarily stores fogginess sensor signals and exterior sensor signals received in a preceding certain period, a flag indicating a currently applied driving control level, and various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process.

Figure 3:
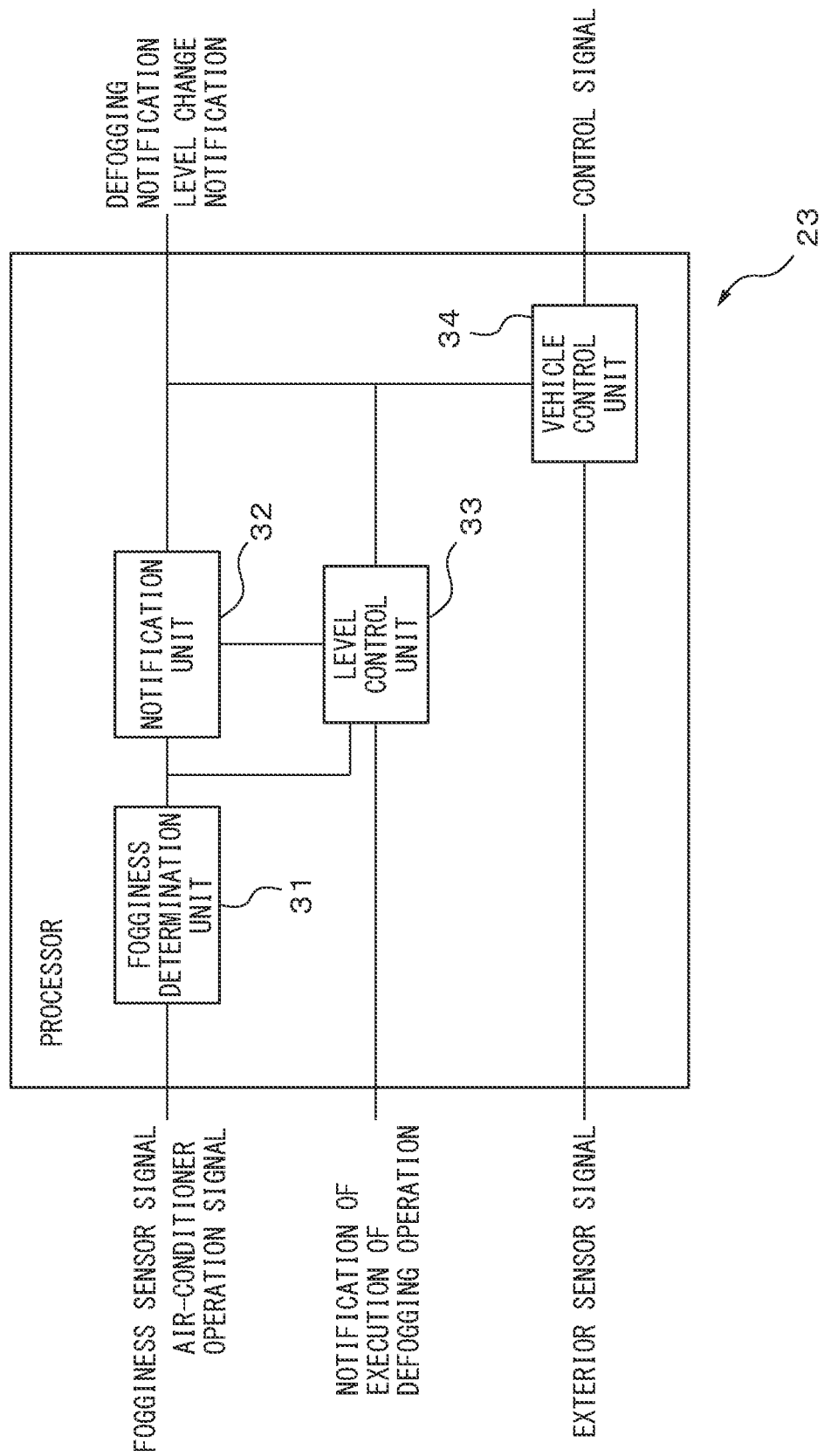
FIG. 3 is a functional block diagram of a processor of the ECU, related to a vehicle control process.

FIG. 3 is a functional block diagram of the processor 23, related to the vehicle control process. The processor 23 includes a fogginess determination unit 31, a notification unit 32, a level control unit 33, and a vehicle control unit 34. These units included in the processor 23 are functional modules, for example, implemented by a computer program executed by the processor 23, or may be dedicated operating circuits separately provided in the processor 23.

The fogginess determination unit 31 determines whether there is fogging on a window or a sign of fogging, based on a fogginess sensor signal. In the present embodiment, since the fogginess sensor signal indicates a measured value of humidity of the interior of the vehicle 10, as described above, the fogginess determination unit 31 determines that there is fogging on the window, when the measured value of humidity exceeds a fogginess determination threshold. In addition, the fogginess determination unit 31 determines that there is a sign of fogging of the window, when the measured value of humidity exceeds a fogginess sign threshold. The fogginess sign threshold is set at a value less than the fogginess determination threshold for determining that the window has actually fogged.

Alternatively, the fogginess determination unit 31 predicts time-varying changes in humidity in the future by extrapolating time-varying changes in the measured values of humidity in a preceding predetermined period. In the case where the predicted humidity exceeds the fogginess determination threshold in a certain period, the fogginess determination unit 31 determines that there is a sign of fogging of the window.

In addition, the fogginess determination unit 31 may determine whether there is a sign of fogging of the window, based on an operation signal received from the air conditioner 6. For example, in the case where the air conditioner 6 executed operation for defogging at timing immediately after the start of driving the vehicle 10, the window may fog again, depending on the environment around the vehicle 10, even if the window was not fogged at the end of the operation. Thus the fogginess determination unit 31 may determine that there is a sign of fogging of the window, when an operation signal received from the air conditioner 6 indicates that the air conditioner 6 executed operation for defogging in a preceding predetermined period.

The fogginess determination unit 31 notifies the notification unit 32 and the level control unit 33 of the result of determination whether there is fogging on the window or a sign of fogging. When fogginess determination is made on the basis of predicted values of humidity, the fogginess determination unit 31 notifies the notification unit 32 of the predicted time until the predicted humidity exceeds the fogginess determination threshold.

Upon receiving the result of determination that there is fogging on the window or a sign of fogging from the fogginess determination unit 31, the notification unit 32 outputs notification to urge on the driver operation to cause a vehicle-mounted device, such as the air conditioner 6, to execute operation for defogging (hereafter "defogging notification") to the notification device 4. In the defogging notification, the notification unit 32 may include a message representing a waiting period in which the vehicle-mounted device is to be operated to execute defogging operation. When autonomous driving control is applied to the vehicle 10, the notification unit 32 may further include a message meaning that it will be difficult to continue autonomous driving control, in the defogging notification. When autonomous driving control is not applied to the vehicle 10, the notification unit 32 may further include a message meaning that it will be difficult to apply autonomous driving control, in the defogging notification. In this way, the notification unit 32 can inform the driver that it will be difficult to continue or apply autonomous driving control unless the vehicle-mounted device executes operation for defogging.

When fogginess determination is made on the basis of predicted values of humidity, the notification unit 32 may make the timing of defogging notification earlier as the predicted time until the predicted humidity exceeds the fogginess determination threshold is shorter. More specifically, the notification unit 32 may set the timing of defogging notification so that the waiting period from the timing of defogging notification until the predicted humidity exceeds the fogginess determination threshold is shorter as the predicted time is shorter. In this way, the notification unit 32 increases the degree of the driver's involvement in driving before the window actually fogs, enabling more appropriate prevention of destabilization of driving control of the vehicle 10.

The notification unit 32 notifies the level control unit 33 that the driver is informed of defogging notification via the notification device 4. Upon notified of a change of applicable driving control level by the level control unit 33, the notification unit 32 outputs the notification to the notification device 4.

The level control unit 33 determines whether a vehicle-mounted device capable of defogging operation has executed defogging operation before a lapse of a predetermined waiting period from when the driver is informed of defogging notification via the notification device 4. When the ECU 5 receives a signal indicating that defogging operation has been executed from a vehicle-mounted device capable of defogging operation, the level control unit 33 determines that the vehicle-mounted device has executed defogging operation. The vehicle-mounted device capable of defogging operation may be, for example, the air conditioner 6 or a deicer. The defogging operation by the vehicle-mounted device may be, for example, operation of defogger by the air conditioner 6 or operation of the deicer.

When the vehicle-mounted device has not executed defogging operation even after the predetermined waiting period from the defogging notification, the level control unit 33 determines whether the sign of fogging of the window has disappeared. Examples of the state in which the sign of fogging of the window has not disappeared include the state in which the window is kept fogged. For example, when the humidity after the predetermined waiting period is higher than a fogginess disappearance threshold, the level control unit 33 determines that the sign of fogging of the window has not disappeared. The fogginess disappearance threshold is preferably set at a value greater than the fogginess sign threshold and less than the fogginess determination threshold. Alternatively, the level control unit 33 may predict changes in humidity after the predetermined waiting period by processing similar to that executed by the fogginess determination unit 31. The level control unit 33 may then determine that the sign of fogging of the window has not disappeared, when the predicted value of humidity exceeds the fogginess determination threshold within a certain period of the defogging notification.

In the case where the predetermined waiting period has elapsed since the defogging notification, and where the sign of fogging of the window has not disappeared, the level control unit 33 refers to a flag indicating the driving control level currently applied to the vehicle 10, which is stored in the memory 22, to check the level. The level control unit 33 then degrades autonomous driving control of the vehicle, depending on the currently applied driving control level. More specifically, the level control unit 33 changes the applicable driving control level so as to increase or prevent decreasing the degree of the driver's involvement in driving the vehicle 10. The level control unit 33 then outputs notification depending on the level after the change to the notification unit 32 to inform the driver of a request depending on the level after the change.

For example, assume that the level of autonomous driving control applied to the vehicle 10 is such that driving control is executed without the driver's involvement in driving, e.g., level 3 defined by the Society of Automotive Engineers (SAE). In this case, the level control unit 33 changes the driving control level applicable to the vehicle 10 to a level at which the driver need not perform driving operation of the vehicle 10 but is required to watch around the vehicle 10 (e.g., level 2 defined by SAE). When level 2 driving control is applied to the vehicle 10, the level control unit 33 changes the driving control level to a level at which the ECU 5 continues driving control on condition that the driver holds the steering wheel of the vehicle 10. The way to change levels is not limited to the above, and the level control unit 33 may change the applicable driving control level to a level at which the driver's driving operation is required (i.e., level 0 or 1 defined by SAE) when the currently applied driving control level is level 3 or 2. In addition, when the currently applied driving control level is such that the driver's driving operation is required (i.e., when the currently applied driving control level is level 0 or 1), the level control unit 33 does not permit application of driving control of a level at which the driver's driving operation is not required. In other words, the level control unit 33 excludes driving control of level 2 or higher from application.

When fogginess determination is made on the basis of predicted values of humidity, the level control unit 33 may make the waiting period shorter as the predicted time until the predicted humidity exceeds the fogginess determination threshold is shorter, similarly to the notification unit 32. In this way, the level control unit 33 increases the degree of the driver's involvement in driving before the window actually fogs, enabling more appropriate prevention of destabilization of driving control of the vehicle 10.

Figure 4:
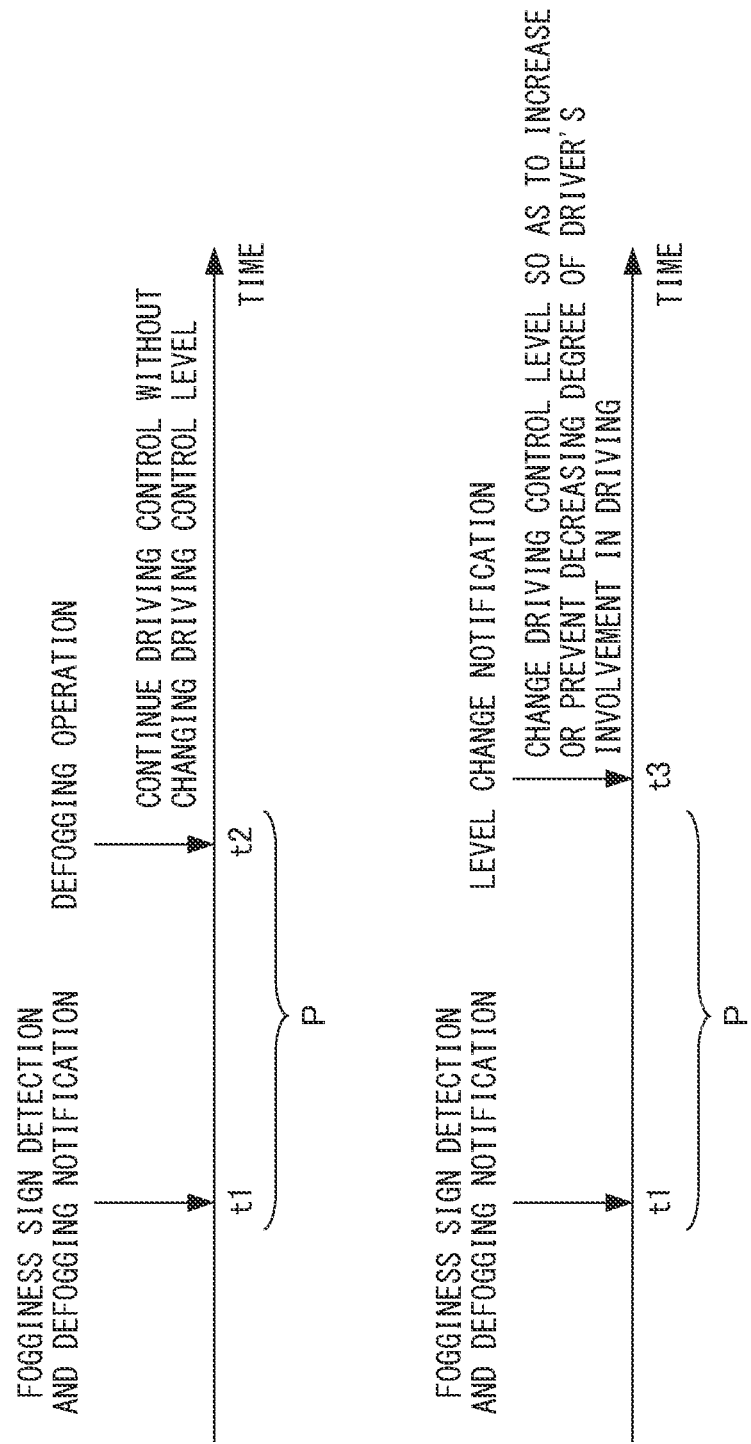
FIG. 4 illustrates an example of the relationship between fogginess determination and a change of vehicle control level.

FIG. 4 illustrates an example of the relationship between fogginess determination and a change of vehicle control level. In FIG. 4, the abscissa represents time. In the example illustrated on the upper side of FIG. 4, at time t1, it is determined that there is a sign of fogging of a window, and the driver is informed of defogging notification via the notification device 4. Thereafter, defogging operation by a vehicle-mounted device, such as the air conditioner 6, starts at time t2, which is before the end of a waiting period P. Hence, currently applied driving control continues without a change of level. When the surroundings of the vehicle 10 allow application of driving control of a level higher than the currently applied level to the vehicle 10, a change to driving control of the higher level is not prohibited.

In the example illustrated on the lower side of FIG. 4 also, at time t1, it is determined that there is a sign of fogging of a window, and the driver is informed of defogging notification via the notification device 4. However, in this example, defogging operation by a vehicle-mounted device is not executed even after a waiting period P. Hence, in the case where the sign of fogging of the window has not disappeared at time t3, which is after the waiting period P, the applicable driving control level is changed so as to increase or prevent decreasing the degree of the driver's involvement in driving. The driver is informed of requirements of the level after the change.

The vehicle control unit 34 executes autonomous driving control of the vehicle 10 according to the driving control level applied to the vehicle 10.

For example, when level 3 driving control is applied, the vehicle control unit 34 detects lane-dividing lines demarcating a lane on which the vehicle 10 is traveling (hereafter a "host vehicle lane") and objects around the vehicle 10 (e.g., other vehicle and pedestrians) from an exterior sensor signal obtained by the vehicle exterior sensor 3. The vehicle control unit 34 then sets a planned trajectory along which the vehicle 10 will travel in a section from the current position of the vehicle 10 to a predetermined distance away, based on the detected lane-dividing lines and moving objects. The planned trajectory is set, for example, as a set of target positions of the vehicle 10 at respective times. The vehicle control unit 34 sets the planned trajectory, for example, so that the vehicle 10 will not collide with the surrounding objects and travel along the host vehicle lane. The vehicle control unit 34 controls components of the vehicle 10 so that the vehicle 10 will travel along the set planned trajectory.

In this case, the vehicle control unit 34 may detect objects around the vehicle 10 and lane-dividing lines by inputting an exterior sensor signal into a classifier that has been trained to detect objects around the vehicle 10 and a lane-dividing line from an exterior sensor signal. As such a classifier, the vehicle control unit 34 can use, for example, a "deep neural network (DNN)" having architecture of a convolutional neural network (CNN) type. Such a classifier is trained in advance in accordance with a training technique, such as backpropagation, with a large number of training images representing detection target objects or lane-dividing lines.

In the case where application of level 3 is permitted only when travel environment of the vehicle 10 satisfies a predetermined condition, the vehicle control unit 34 may determine whether the predetermined condition is satisfied. For example, in the case where application of level 3 is permitted only when traffic around the vehicle 10 is congested, the vehicle control unit 34 may determine whether traffic around the vehicle 10 is congested. In this case, the vehicle control unit 34 determines that traffic around the vehicle 10 is congested, when the speed of the vehicle 10 measured by a vehicle speed sensor (not illustrated) satisfies a predetermined congestion condition. Alternatively, the vehicle control unit 34 may determine that traffic around the vehicle 10 is congested, when the speed of a target vehicle estimated by tracking the target vehicle satisfies the predetermined congestion condition; the target vehicle is detected on the basis of an exterior sensor signal and traveling in an area around the vehicle 10. Alternatively, the vehicle control unit 34 may determine that traffic around the vehicle 10 is congested, when the current position of the vehicle 10 determined by the GPS receiver (not illustrated) is within a congested section indicated by traffic information received via the wireless communication device (not illustrated).

When autonomous driving control of the vehicle 10 is executed under condition that the driver watches around the vehicle 10, the vehicle control unit 34 obtains an image representing the driver (hereafter a "driver image") from a driver monitoring camera (not illustrated) provided in the vehicle interior. The vehicle control unit 34 then detects the driver's looking direction or face orientation from the driver image to determine whether the driver is watching around the vehicle 10. The vehicle control unit 34 controls driving of the vehicle 10 as in the case of application of level 3 described above only when the driver is watching around the vehicle 10. The vehicle control unit 34 detects the looking direction or face orientation in accordance with one of various techniques to detect a driver's looking direction or face orientation represented in an image. For example, the vehicle control unit 34 detects corneal reflection images of a light source illuminating the driver and the driver's pupillary centroids from a driver image, and detects the driver's looking direction, based on the positional relationship between the corneal reflection images and the pupillary centroids.

When autonomous driving control of the vehicle 10 is executed under condition that the driver holds the steering wheel, the vehicle control unit 34 determines whether the driver is holding the steering wheel, based on a signal from a contact sensor (not illustrated) provided on the steering wheel.

Figure 5:
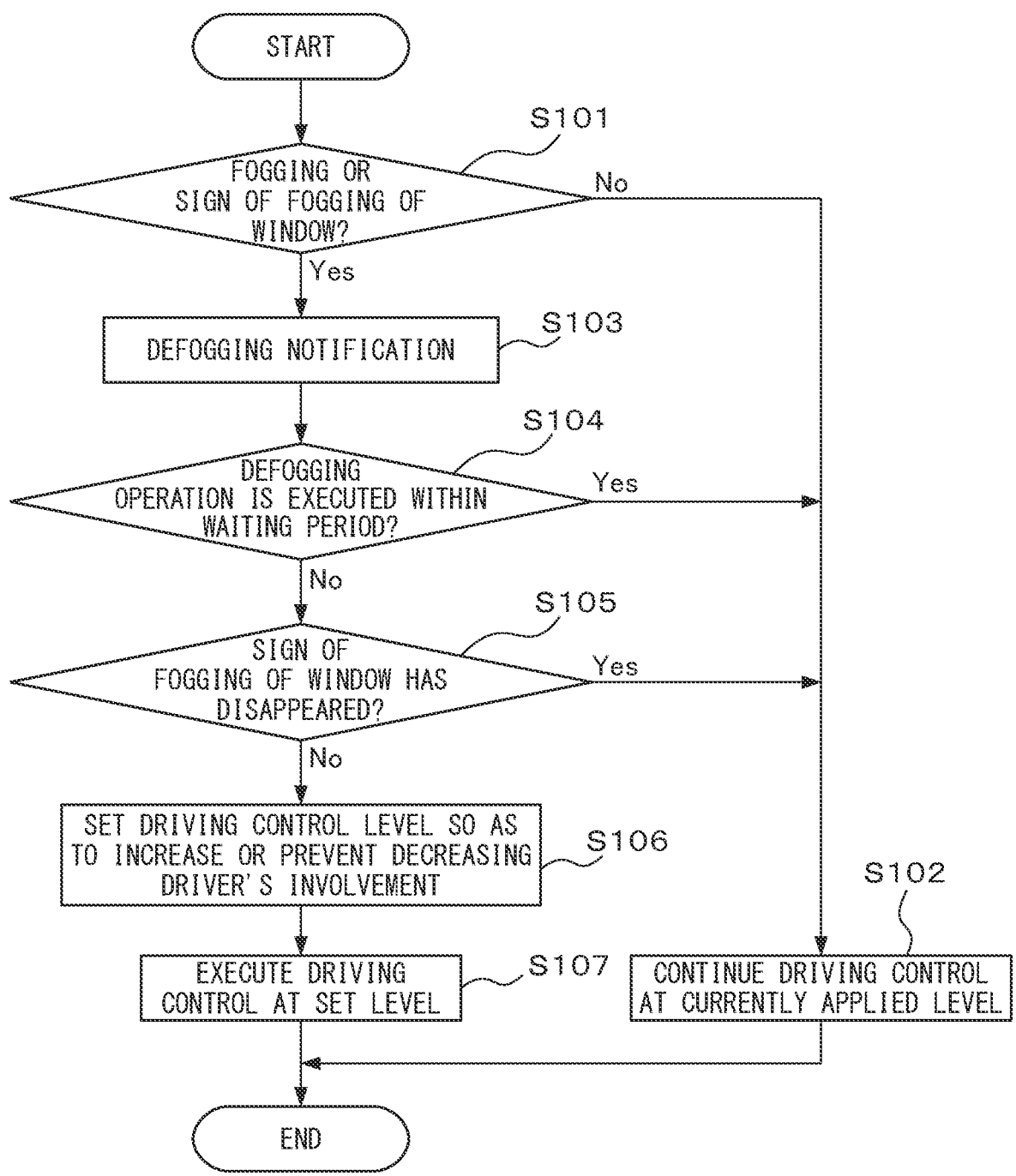
FIG. 5 is an operation flowchart of the vehicle control process.

FIG. 5 is an operation flowchart of the vehicle control process executed by the processor 23. The processor 23 executes the vehicle control process in accordance with the operation flowchart described below at predetermined intervals.

The fogginess determination unit 31 of the processor 23 determines whether there is fogging on a window or a sign of fogging, based on a fogginess sensor signal (step S101). When it is determined that there is not fogging or a sign of fogging (No in step S101), the vehicle control unit 34 of the processor 23 continues driving control of the vehicle 10 at the currently applied driving control level (step S102). As described above, when the surroundings of the vehicle 10 allow application of driving control of a level higher than the currently applied level to the vehicle 10, a change to driving control of the higher level is not prohibited.

When it is determined that there is fogging on the window or a sign of fogging (Yes in step S101), the notification unit 32 of the processor 23 informs the driver of defogging notification via the notification device 4 (step S103).

After step S103, the level control unit 33 of the processor 23 determines whether defogging operation is executed by a vehicle-mounted device before a lapse of a predetermined waiting period from when the driver is informed of defogging notification (step S104). When defogging operation is executed before a lapse of a predetermined waiting period (Yes in step S104), the vehicle control unit 34 continues driving control of the vehicle 10 at the currently applied control level (step S102).

When defogging operation is not executed even after the waiting period (No in step S104), the level control unit 33 determines whether the sign of fogging of the window has disappeared (step S105). When the sign of fogging of the window has disappeared (Yes in step S105), the vehicle control unit 34 continues driving control of the vehicle 10 at the currently applied control level (step S102).

When the sign of fogging of the window has not disappeared (No in step S105), the level control unit 33 refers to the state of autonomous driving control currently applied to the vehicle 10. The level control unit 33 then changes the applicable driving control level so as to increase or prevent decreasing the degree of the driver's involvement in driving, depending on the state of currently applied autonomous driving control (step S106). The vehicle control unit 34 executes autonomous driving control of the vehicle 10 at the set level (step S107).

After step S102 or S107, the processor 23 terminates the vehicle control process.

As has been described above, the vehicle controller determines the presence or absence of fogging on a window of a vehicle or a sign of fogging. Upon determination that there is fogging or a sign of fogging, the vehicle controller changes the applicable driving control level so as to increase or prevent decreasing the degree of the driver's involvement in vehicle control, depending on the state of autonomous driving control of the vehicle. In this way, the vehicle controller can prevent vehicle control from being destabilized when a vehicle window fogs. In addition, the vehicle controller notifies the driver that a vehicle-mounted device is to execute defogging operation before the vehicle window actually fogs, and thus prevents the vehicle window from actually fogging and thereby enables continuing driving control at a currently applied level.

According to a modified example, the vehicle 10 may be provided with an inside temperature sensor that measures the temperature of the interior of the vehicle 10 (hereafter simply the "inside temperature"), and an outside temperature sensor that measures the temperature of the outside of the vehicle 10 (hereafter simply the "outside temperature"), as the fogginess sensor 2. In this case, the physical index related to the degree of fogging is the inside and outside temperatures. The fogginess determination unit 31 determines whether there is a sign of fogging of a window, based on a combination of the inside and outside temperatures. For example, when the difference between the inside and outside temperatures obtained as a fogginess sensor signal satisfies a fogginess sign condition, the fogginess determination unit 31 determines that there is a sign of fogging of the window. The fogginess sign condition is preset and stored in the memory 22. When the difference does not satisfy the fogginess sign condition, the fogginess determination unit 31 determines that there is not a sign of fogging of the window at the time of determination. Similarly, the level control unit 33 may determine that the sign of fogging of the window has disappeared, when the difference between the inside and outside temperatures does not satisfy the fogginess sign condition in the case where defogging operation is not executed even after the predetermined waiting period from defogging notification.

Alternatively, the fogginess determination unit 31 may further use one or more of rainfall per unit time, an operation signal of windshield wipers (not illustrated), weather information, and the number of occupants of the vehicle 10 for determination of the presence or absence of fogging on a window or a sign of fogging. In this case, when the fogginess sensor signal and these values satisfy predetermined fogginess sign conditions, the fogginess determination unit 31 determines that there is a sign of fogging of the window. The rainfall per unit time is measured by a rainfall sensor (not illustrated) mounted on the vehicle 10. The weather information is obtained via the wireless communication device (not illustrated) mounted on the vehicle 10. The fogginess determination unit 31 may detect the number of occupants by inputting an interior image generated by a camera provided on the vehicle 10 so as to take pictures of the interior of the vehicle 10 into a classifier that has been trained to detect a human. Alternatively, the fogginess determination unit 31 may detect the number of occupants, based on detection signals from pressure sensors (not illustrated) provided in respective seats in the vehicle interior or signals indicating fastening and unfastening from seatbelts.

According to another modified example, when application of autonomous driving control is prohibited because the vehicle-mounted device executed defogging operation for a preceding predetermined period, the level control unit 33 may notify the driver of the time left before prohibition of the application is removed, via the notification device 4. In this case, for example, the level control unit 33 calculates the time left before prohibition of application of autonomous driving control is removed, based on the time elapsed since the start of operation of the air conditioner 6. For example, an estimated time from the start time of operation of the air conditioner 6 until the sign of fogging of the window disappears is prestored in the memory 22. The estimated time may be set for each humidity value of the vehicle interior at the start of operation of the air conditioner 6. The level control unit 33 calculates the time left before prohibition of application of autonomous driving control is removed, by subtracting, from the estimated time, the time elapsed from the start time of operation of the air conditioner 6 until the current time. According to this modified example, the driver can know the time left before application of autonomous driving control is allowed, which improves the driver's convenience.

According to still another modified example, the level control unit 33 may immediately increase or prevent decreasing the degree of the driver's involvement in driving the vehicle 10, upon determination that there is fogging on the window or a sign of fogging. The notification unit 32 may then output notification about the change of the degree of the driver's involvement in driving to the notification device 4. According to this modified example, the level control unit 33 can shorten the time from determination that there is fogging on the window or a sign of fogging until the change of the degree of the driver's involvement in driving. This enables the level control unit 33 to prevent autonomous driving control of the vehicle 10 from being destabilized even when the window rapidly fogs.

The computer program for achieving the functions of the processor 23 of the ECU 5 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A vehicle controller comprising:
a processor configured to:
determine whether there is fogging on a window of a vehicle or a sign of fogging thereof, based on a fogginess sensor signal indicating a physical index related to the degree of fogging of the window, the fogginess sensor signal being obtained by a fogginess sensor provided on the vehicle;
notify the driver that a vehicle-mounted device of the vehicle capable of a defogging operation is to be operated by the driver to execute the defogging operation, via a notification device provided on the vehicle, upon determination that there is a sign of fogging of the window;
determine whether the defogging operation has been executed within a predetermined waiting period after the driver is notified to execute the defogging operation; and
change a driving control level applicable to the vehicle so as to increase or prevent decreasing the degree of a driver's involvement in driving the vehicle, depending on the driving control level currently applied to the vehicle, upon determination that the defogging operation has not been executed by the driver within the predetermined waiting period and the sign of fogging on the window has not disappeared.

2. The vehicle controller according to claim 1, wherein when the driving control level currently applied to the vehicle is such that the driver's driving operation is required, the processor prevents decreasing the degree of involvement by prohibiting application of a driving control level at which the driver's driving operation is not required.

3. The vehicle controller according to claim 1, wherein when the driving control level currently applied to the vehicle is such that driving control is executed without the driver's involvement in driving, the processor increases the degree of involvement by changing the driving control level to a level at which the driver is required to watch around the vehicle.

4. The vehicle controller according to claim 3, wherein the processor is further configured to notify the driver that it is difficult to continue autonomous driving control of the vehicle, via a notification device provided on the vehicle, upon determination that there is a sign of fogging of the window, wherein
after the predetermined waiting period from the notification, the processor changes the driving control level to a level at which the driver is required to watch around the vehicle.

5. The vehicle controller according to claim 1, wherein the processor is further configured to
change the driving control level applicable to the vehicle so as to increase the degree of the driver's involvement in driving the vehicle, based upon the determination that the vehicle-mounted device does not execute the defogging operation after the predetermined waiting period from the notification, and the sign of fogging of the window has not disappeared.

6. The vehicle controller according to claim 1, wherein the vehicle-mounted device is an air conditioner, and after the processor previously determined that there is a sign of fogging of the window, the processor determines that there is a sign of fogging of the window at present in the case where the air conditioner is not executing defogging operation at present and executed defogging operation in a preceding predetermined period.

7. A method for vehicle control, comprising:
determining whether there is fogging on a window of a vehicle or a sign of fogging thereof, based on a fogginess sensor signal indicating a physical index related to the degree of fogging of the window, the fogginess sensor signal being obtained by a fogginess sensor provided on the vehicle;
notifying the driver that a vehicle-mounted device of the vehicle capable of a defogging operation is to be operated by the driver to execute the defogging operation, via a notification device provided on the vehicle, upon determination that there is a sign of fogging of the window;
determining whether the defogging operation has been executed within a predetermined waiting period after the driver is notified to execute the defogging operation; and
changing a driving control level applicable to the vehicle so as to increase or prevent decreasing the degree of a driver's involvement in driving the vehicle, depending on the driving control level currently applied to the vehicle, upon determination that the defogging operation has not been executed by the driver within the predetermined waiting period and the sign of fogging on the window has not disappeared.

8. A non-transitory recording medium that stores a computer program for vehicle control, the computer program causing a processor mounted on a vehicle to execute a process comprising:
determining whether there is fogging on a window of the vehicle or a sign of fogging thereof, based on a fogginess sensor signal indicating a physical index related to the degree of fogging of the window, the fogginess sensor signal being obtained by a fogginess sensor provided on the vehicle;
notifying the driver that a vehicle-mounted device of the vehicle capable of a defogging operation is to be operated by the driver to execute the defogging operation, via a notification device provided on the vehicle, upon determination that there is a sign of fogging of the window;
determining whether the defogging operation has been executed within a predetermined waiting period after the driver is notified to execute the defogging operation; and
changing a driving control level applicable to the vehicle so as to increase or prevent decreasing the degree of a driver's involvement in driving the vehicle, depending on the driving control level currently applied to the vehicle, upon determination that the defogging operation has not been executed by the driver within the predetermined waiting period and the sign of fogging on the window has not disappeared.

* * * * *